July 27, 1965
G. B. FARKAS ETAL
3,197,286
LIQUID PHASE REACTOR
Filed Feb. 18, 1963
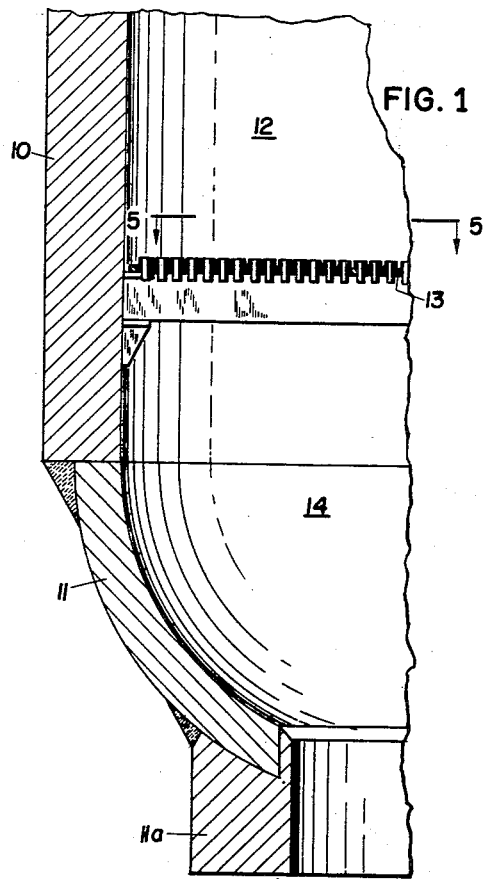
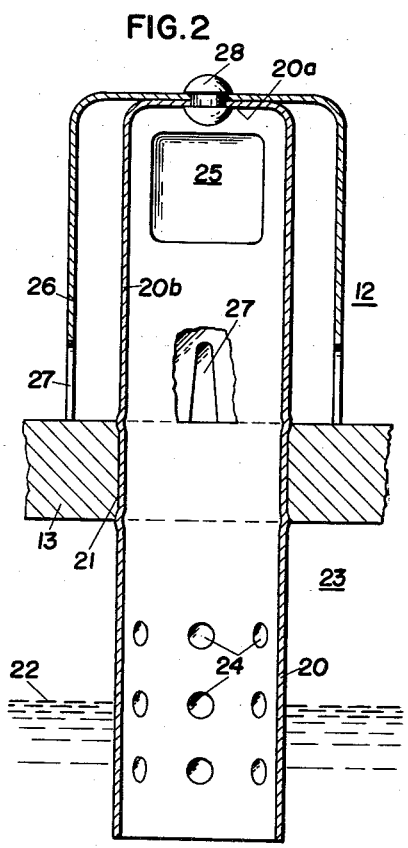
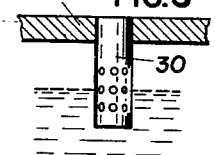
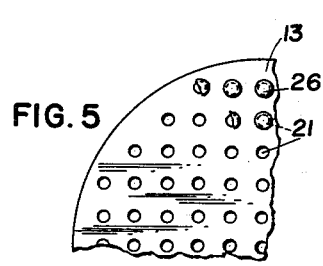
INVENTORS
George B. Farkas
Michael C. Chervenak
BY  Ronald Wolk
Nathaniel Ely
ATTORNEY United States Patent Office 3,197,286
Patented July 27, 1965

3,197,286
LIQUID PHASE REACTOR
George B. Farkas, Jackson Heights, N.Y., and Michael C. Chervenak, Pennington, and Ronald Wolk, Trenton, N.J., assignors to Hydrocarbon Research, Inc., New York, N.Y., a corporation of New Jersey
Filed Feb. 18, 1963, Ser. No. 259,292
1 Claim. (Cl. 23—285)

This invention relates to a liquid phase reactor, and is more particularly an improved form of apparatus for the hydrogenation of hydrocarbons such as described in the Johanson patent, No. 2,987,465.

Hydrogenation reactions in the presence of contact materials maintained in a random motion in a liquid, as is described in the above patent, are accomplished by the upward flow of gas and liquid through the bed and are usually accompanied by recycle of the liquid and gas effluent. In order to carry out the reaction at the most advantageous conditions, it is necessary to expand the bed at least 10%, and generally not more than 300%, so that the particles are placed in constant random motion in the liquid without being carried out of the reaction zone. The velocities of liquid and gas necessary for this expansion are a function of the size and density of the contact material, the density and viscosity of the liquid, and the density and viscosity of the gas. The velocity necessary can be readily ascertained for any combination of circumstances.

In accordance with our invention, we provide an improved apparatus for the effective operation of the new process primarily to assure a uniform distribution of gas and liquid across the inlet to the reaction zone. The uniform introduction of gas and liquid yields several advantages. Among these are, a more uniform fluidization across the bottom of the reactor which prevents any dead spots or non-fluidized bits of contact material which tend to agglomerate into a solid mass, to prevent any area of the cross-section to be without gas which would cause coking of the liquid in the case of a hydrogen-oil reaction, and to prevent any sudden surges of gas or liquid which would tend to interfere or destroy the fluidization pattern which exists.

Other objects and advantages of our invention will appear from the following description of a preferred form of embodiment thereof when taken in connection with the attached drawing illustrative thereof in which:

FIGURE 1 is a vertical section of a part of a hydrogenation reactor.

FIGURE 2 is an enlarged vertical section through a preferred form of gas-liquid distributor.

FIGURE 3 is a schematic vertical section and elevation of a modified type of gas-liquid distributor.

FIGURE 4 is an elevation with parts in section of a still further modified form of liquid distributor.

FIGURE 5 is a partial plan view of the fluid distributor shown in FIGURE 1 and taken along the line 5—5 thereof.

As more particularly shown in FIGURE 1, the reactor 10 is a thick walled usually cylindrical vessel adapted for the hydrogenation of hydrocarbons in which pressures are in excess of 400 p.s.i.g. and may go as high as 5000 p.s.i.g., and in which the temperatures are usually not lower than about 500° F. and often as high as 1000° F. Such vessel has a typical hemispherical bottom section 11 containing manhead 11a and will, in addition, have a similar upper section.

In a hydrogenaiton reaction as well as in many other liquid-solids-gas reactions, the reaction zone indicated as that portion 12 above the supporting deck 13 will be filled with solids of a particulate character ranging from as large as ¼ inch to 200 mesh, such solids being of an inert or of a catalytic character depending upon the reaction.

To support such solids, a transverse distributor plate or deck 13 extends across the lower part of the reactor 10 separating the reaction zone from a plenum chamber 14 into which liquids and gas, and in some cases solids, will be introduced through the manhead section 11a. Various means may be used to remove the reactants as by a conventional discharge conduit which may extend from an upper part of the reaction zone 12 and also extend through the manhead 11a to accomplish the desired withdrawal.

Between the outlet from the inlet to the reaction zone there may be various pieces of apparatus for cooling or heating or pumping or regenerating, or otherwise separating the effluent to place it in condition for recycle into the plenum chamber 14. One such arrangement is shown in the Chervenak patent, 2,987,468.

Our invention more particularly applies to the distributor plate or deck 13 which is arranged to uniformly distribute the liquid and gas flow from the plenum chamber 14 across the deck 13 and throughout the reaction zone 12. This is a function of uniform pressure drop as well as the distribution of openings across the deck and it requires openings of sufficient size to prevent plugging and in the specific case when solids are present in the reaction zone, it requires control of the possible backflow of the solids into the plenum chamber. The uniform distribution of the fluid flow is critical to assure efficient contact with the solids in the reaction zone and to avoid the formation of large gas bubbles, surges, etc.

A preferred form of flow control is more particularly shown in FIGURE 2 wherein the deck 13 is uniformly perforated and has a series of bubble caps. These include the riser portion 20 extending through the openings 21 in the deck 13. Usually, it is found desirable to continue the riser portion 20 substantially below the deck 13 and generally into the liquid zone indicated at 22. As hereinafter described, this will result in a gas area 23 between the liquid level 22 and the bottom of the deck 13.

Ordinarily, it will be found that the gas in the zone 23 above the liquid level and below the deck 13 will tend to depress the liquid level 22 adjacent the bottom of the tubular extension 20 and permit a sudden surge of gas up through the riser 20 and deck 13. This causes such erratic flow as to be reflected in non-uniform fluidization and poor contacting of gas, liquid and solid and is to be avoided as far as possible.

In accordance with our invention, the tubular riser 20 is provided with a riser of transverse openings 24 of which there are several levels such that at all times the gas may pass directly through the openings 24 into the tubular extension 20 and thus upwardly through the deck 13. This does not interfere with the continued flow of liquid up through the open lower end of the tubular riser 20. While these openings 24 are shown as substantially cylindrical holes, they could also be vertical slots.

If by virtue of changed conditions there is a tendency to trap greater amounts of gas in the zone 23 to the extent that the liquid level 22 will drop, a second or third series of openings 24 will permit the continued free flow of gas up the riser. By such means, the gas-liquid flow is self-regulating and a uniform and continuous flow of the relative amounts desired for the reaction can be accomplished.

When the reactor is filled with solids, the tubular riser 20 extends not only below the deck 13 but above the deck 13, and conveniently has a closed top portion 20a. Below the top portion 20a it will have an opening 25 to permit the liquids and gases to pass out of the riser into the reaction zone 12. Usually, an additional cap 26 having slotted openings 27 is mounted as by the rivet 28 on the riser portion 20a and the tubular extension 20. The liquids and fluids are thereby distributed adjacent the deck 13 by the openings 27 which are uniformly distributed around the periphery.

If the reactor is not filled with solids, no such cap is required and all that is required is the riser 30 which preferably extends flush with the upper surface of the deck 13 as shown in FIGURE 3.

As discussed with respect to FIGURE 2, the riser 30 corresponds with the lower part of riser 20 as shown in FIGURE 2 and similarly has a series of apertures through the wall to permit continued and independent flow of gas and liquid.

In accordance with our invention, we find it desirable in some cases to avoid objectionable gas surges which might result from jet action of the fluids in the plenum chamber 14. By the use of a J type riser 35 as shown in FIGURE 4, the upper part of the fluid distributor being similarly provided with a cap 26 of the type shown in FIGURE 2 and with the opening to the bottom of the tubular extension upturned, any jet effect due to the influence of channeling of liquid is avoided. Not all the risers need be of this type as the adjacent vapor risers 36, provided with caps such as shown at 26, may terminate with the bottom of the desk 13 whereby gases and vapors can pass upwardly without tending to choke the flow through the liquid risers 35.

In a hydrogenation reaction, the number of caps of each type used, and the size of the caps, is determined by the need to equalize the pressure drop of the hydrogen and oil. When the gases pass through the respective openings, the pressure drop through the caps should be enough to cause a gas pocket to form directly under the plate. This will serve as a common gas source for the caps passing hydrogen and thus permit uniform gas bubbling up through the oil. The riser 35 shown in FIGURE 4 will prevent the entrance of gas into these caps as such portion is long enough so that the entrance portion is submerged in the pool of oil.

The advantage of uniformly introducing hydrogen and oil to a catalyst or contact bed in zone 12 is that the flow pattern in the reaction zone is far superior to that obtained when hydrogen and oil pass through the caps together. This is of substantial importance because at the temperature and pressure conditions existing, an uneven flow will tend to permit coking on the supporting deck.

Furthermore, although the hydrogen and oil pass upwardly and independently through the respective caps or tubular extensions they can be preheated together which tends to eliminate coking of the oil in the preheater. In addition, no special manifold is needed for hydrogen induction which simplifies reactor design and lowers cost.

While we have shown and described a preferred form of embodiment of our invention, we are aware that modifications may be made thereto within the scope and spirit of the description herein and of the claim appended hereinafter.

We claim:

A liquid phase reactor wherein a liquid and a gas are passed upwardly through a reaction zone in the presence of a catalyst, said reactor comprising a pressure chamber, a fluid distributor extending transversely across the lower part of the chamber, said fluid distributor having a plurality of fluid passages extending therethrough, means to introduce a liquid and a gas to the lower part of said chamber below the fluid distributor, open ended tubular members extending downwardly from said fluid passages, risers extending upwardly from the fluid passages, a bubble cap surmounting each riser, each of the tubular members having a plurality of vertically spaced holes, the lower open end of the tubular member being at all times submerged in a zone normally containing liquid and gas for the passage of said liquid and gas upwardly therethrough, the aforesaid holes being adapted to provide outlets for any gases trapped between the lower face of the distributor and the upper surface of the liquid zone in which the lower end of the tubular member is submerged whereby the liquid and gas may pass upwardly through the distributor to provide uniform flow across the upper face of the distributor.

References Cited by the Examiner
UNITED STATES PATENTS

| | | | |
|---|---|---|---|
| 1,776,589 | 9/30 | Keith | 261—114 |
| 1,850,930 | 3/32 | Heid | 261—114 |
| 2,302,328 | 11/42 | Kelly. | |
| 2,491,209 | 12/49 | Rapisarda et al. | 261—114.1 |

MORRIS O. WOLK, *Primary Examiner.*